United States Patent [19]

Rühringer et al.

[11] Patent Number: 5,658,042
[45] Date of Patent: Aug. 19, 1997

[54] LAMELLA ROOF FOR A MOTOR VEHICLE

[75] Inventors: Erich Rühringer, Magstadt; Wolfgang Adam, Nagold; Volker Richters, Sindelfingen, all of Germany

[73] Assignee: Mercedes-Benz AG, Stuttgart, Germany

[21] Appl. No.: 568,570

[22] Filed: Dec. 7, 1995

[30] Foreign Application Priority Data

Dec. 7, 1994 [DE] Germany .................. 44 43 526.6

[51] Int. Cl.[6] .................................................. B60J 7/047
[52] U.S. Cl. ...................... 296/216; 296/220; 160/202
[58] Field of Search ............................ 296/216, 220; 160/229.1, 202

[56] References Cited

U.S. PATENT DOCUMENTS

| | | | |
|---|---|---|---|
| 1,826,871 | 10/1931 | Ford | 160/202 X |
| 2,619,205 | 11/1952 | Best et al. | 49/425 |
| 3,430,676 | 3/1969 | Aberg | 160/202 |
| 3,649,072 | 3/1972 | Cross | 296/220 X |
| 4,068,699 | 1/1978 | Tucker | 160/202 X |

FOREIGN PATENT DOCUMENTS

| | | | |
|---|---|---|---|
| 3149977 | 6/1983 | Germany | 296/220 |
| 4123229C2 | 1/1993 | Germany . | |
| 4233507C1 | 11/1993 | Germany . | |
| 201652 | 8/1923 | United Kingdom . | |
| 337038 | 10/1930 | United Kingdom . | |
| 360160 | 11/1931 | United Kingdom | 296/216 |
| 463048 | 3/1937 | United Kingdom | 296/220 |
| 1194910 | 6/1970 | United Kingdom . | |

OTHER PUBLICATIONS

Search Report Jan. 26, 1996 Great Britain.
French Preliminary Exam Report Mar. 11, 1996 France.

*Primary Examiner*—Dennis H. Pedder
*Attorney, Agent, or Firm*—Evenson, McKeown, Edwards & Lenahan, P.L.L.C.

[57] ABSTRACT

A lamella roof for a motor vehicle is provided with each lamella roof part exhibiting securing catches which extend essentially over the width of the roof cutout and engage behind corresponding securing catches of the respectively adjacent lamella roof parts in the event of the lamella assembly being deformed by force.

3 Claims, 1 Drawing Sheet

LAMELLA ROOF FOR A MOTOR VEHICLE

BACKGROUND AND SUMMARY OF THE INVENTION

The invention relates to a lamella roof for a motor vehicle, which is arranged in a roof cutout of a vehicle bodywork and exhibits a plurality of lamella roof parts which are arranged parallel to and one behind the other in the vehicle longitudinal direction when the roof cutout is closed, the lamella roof parts adjoining one another in a sheet-like lamella assembly. In order to uncover the roof cutout, the lamella roof parts can be moved rearwards, the lamella assembly being gradually separated in the process.

Such lamella roofs are known for passenger cars (German Patent Documents DE 41 23 229 C2 and DE 42 33 507C1). A roof cutout is provided in a roof of the passenger-car bodywork, the cutout being closed off by means of a lamella assembly. The lamella assembly exhibits a plurality of lamella roof parts which are arranged parallel to and one behind the other in the vehicle longitudinal direction. In order to open the lamella roof, i.e., in order to uncover the roof cutout, the lamella assembly is moved rearwards by a drive device, the lamella assembly being gradually separated in that the lamellae become upright individually and are stowed in a rear region of the roof cutout. The lamella roof parts are each guided laterally in corresponding side guides of the roof cutout.

An object of the invention is to provide a lamella roof of the type mentioned in the introduction, the stability of which is increased as regards the action of force due to an accident or due to breaking-open or breaking-in.

This object is achieved according to preferred embodiments of the present invention by providing that each lamella roof part exhibits securing catches which extend essentially over the width of the roof cutout and engage behind corresponding securing catches of the respectively adjacent lamella roof parts in the event of the lamella assembly being deformed by force. Consequently, in the event of force being exerted, the lamella roof parts latch one inside the other over the entire width of the roof cutout, with the result that the sheet-like lamella assembly remains largely intact. By virtue of the individual lamella roof parts catching one inside the other, premature separation of the sheet-like lamella assembly is thus prevented. Of course, the securing catches of corresponding lamella roof parts are designed such that, in the normal operation of the lamella roof, they do not adversely affect the various opening and closing movements of the lamella roof, including the pivoting-out movement of the individual lamella roof parts during the pushing-back operation.

In one development of the invention, the securing catches are provided in the region of associated connection regions of adjacent lamella roof parts, the connection regions overlapping one another parallel to the plane of the lamella assembly. This means that deformation occurring, in particular, transversely with respect to the plane of the lamella assembly are absorbed.

In a further development of the invention, the connection regions exhibit longitudinal edges which are bent over in angular form towards the respectively corresponding connection region, an undercut being formed in the process. This constitutes a particularly simple and effective development since the longitudinal edges bent over in angular form are arranged integrally on the associated lamella roof parts and extend over the entire length of each lamella roof part, i.e., over the entire width of the roof cutout.

In a further development of the invention, in the normal operation of the lamella roof, the longitudinal edges of corresponding connection regions of lamella roof parts are spaced apart from one another such that all those movements of the lamella roof parts which occur during opening or closing can be carried out without adverse effect. This achieves increased stability of the lamella roof without its freedom of movement being adversely affected. Increased safety is thus obtained for the vehicle occupants, the degree of comfort remaining the same.

In a further development of the invention, interspaces remaining between corresponding connection regions of the lamella roof parts are sealed by elastic seals which are each connected to at least one of the two connection regions. This achieves a sufficient sealing between the individual lamella roof parts, which ensures leak-tightness of the lamella roof.

Other objects, advantages and novel features of the present invention will become apparent from the following detailed description of the invention when considered in conjunction with the accompanying drawings.

DETAILED DESCRIPTION OF THE DRAWINGS

Figure 1:
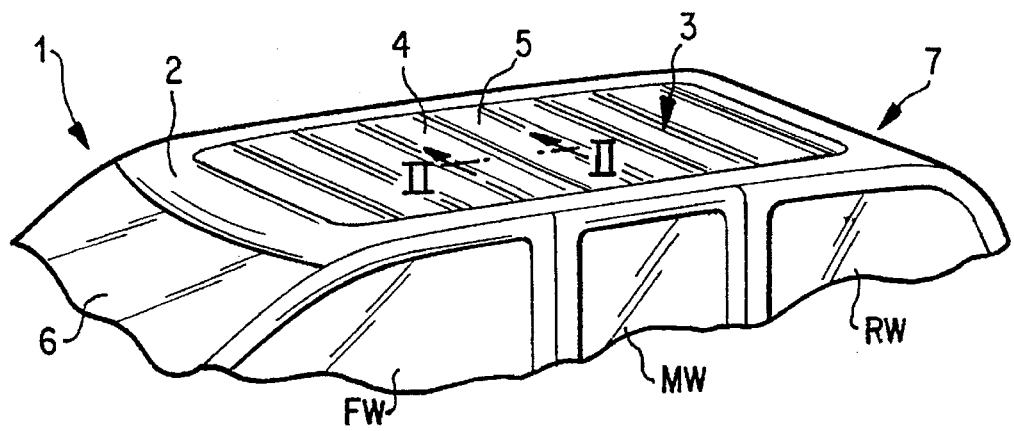
FIG. 1 shows, in a perspective representation, a roof of a passenger car which exhibits a roof cutout closed off by a lamella roof constructed in accordance with a preferred embodiment of the present invention.

A passenger car (1) according to FIG. 1 exhibits a roof (2) which extends in the vehicle longitudinal direction from a windscreen (6) to a rear end (7) of the passenger car (1). The roof (2) exhibits a roof cutout which opens the interior of the passenger car (1) towards the top and extends over approximately the entire length and over approximately the entire width of the roof (2). In the illustrated embodiment, the roof cutout extends over a substantial portion of the length of the front side windows FW adjacent a front seat section and over the entire length of a rear side door window MW and over a substantial part of a rear window RW.

The roof cutout of the roof (2) can be closed off by a lamella roof (3). The lamella roof (3) exhibits a multiplicity of lamella roof parts (4, 5) which extend over the width of the roof cutout and are arranged parallel to and one behind the other in the vehicle longitudinal direction. In the closed state of the lamella roof (3), all the lamella roof parts (4, 5) adjoin one another in a flush manner and form a sheet-like lamella assembly, as is represented in FIG. 1.

Each lamella roof part (4, 5) is guided in a longitudinally displaceable manner in lateral guides on both sides of the roof cutout. Moreover, each lamella roof part (4, 5) can be opened out/upwards in a rear region of the roof cutout. When the lamella roof (3) is opened, the lamella assembly comprising the lamella roof part (4, 5) gradually separates in that the respectively rearmost lamella roof part is opened out/upwards and the respectively following lamella roof part (4, 5) is stacked against it in parallel. In the fully open state of the lamella roof (3), the sheet-like lamella assembly has been separated to the full extent and the linearly displaceable lamella roof parts have been pivoted out and lined up in a row, in the manner of a stack, in the rear region of the roof cutout. Opening and closing of the lamella roof (3) are carried out by a drive device, which is not shown and is not described in any more detail.

Figure 2:
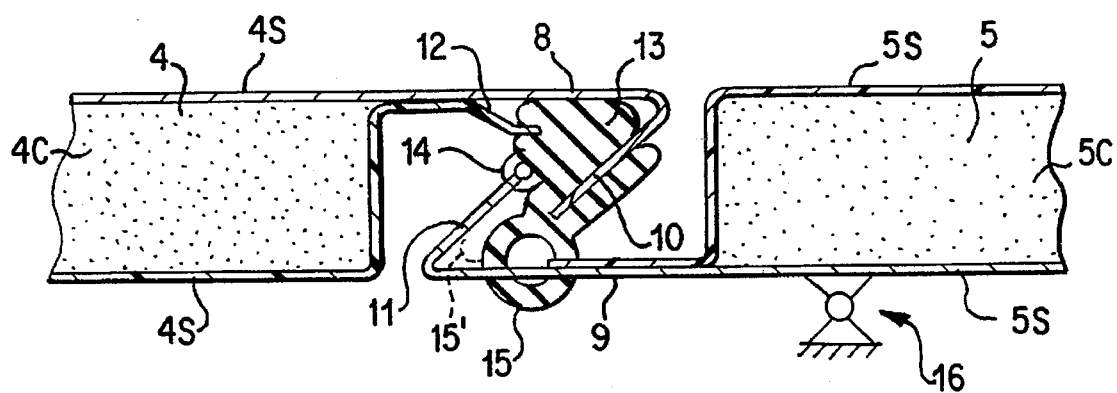
FIG. 2 shows an enlarged detail, as a sectional representation, of the connection regions of two adjacent lamella roof parts of the lamella roof according to FIG. 1, along the section plane II—II in FIG. 1.

According to FIG. 2, the lamella roof part (4) constitutes the lamella roof part which is at the front in the direction of travel, and the lamella roof part (5) constitutes the adjoining lamella roof part (5) which is adjacent towards the rear. Both lamella roof parts (4, 5) exhibit a core (4C, 5C) which consists of an energy-absorbing material and is enclosed by a stable thin-walled plastic or sheet-metal casing (4S, 5S). Both the lamella roof part (4) and the lamella roof part (5) constitute a plate-like element in each case.

The lamella roof part (4, 4S) exhibits a securing catch or connection region (8) which is drawn rearwards towards the lamella roof part (5, 5S) The upper side, serving as outer skin (4S), of the casing is drawn rearwards in a simple manner parallel to the surface of the adjoining lamella roof part (4, 4S). The rear lamella roof part (5) exhibits a corresponding securing catch or connection region (9). Said connection region (9) constitutes an extension of the casing (5S) forming the underside of the lamella roof part (5). In the closed state of the lamella roof (3), in which state all the lamella roof parts form a sheet-like lamella assembly, the connection regions (8, 9) are thus in alignment with the upper sides and the undersides of the lamella roof parts (4, 5). Both the connection region (8) and the connection region (9) extend over the entire length of each lamella roof part (4, 5), ie., over the entire width of the roof cutout.

The connection region (8) exhibits a longitudinal edge (10) which extends over the entire width of the roof cutout and is bent back obliquely downwards at an angle of approximately 45° with respect to the lamella roof part (4), i.e., towards the connection region (9). The connection region (9) exhibits a longitudinal edge (11) which likewise extends over the entire length of the lamella roof part (5), i.e., over the entire width of the roof cutout, and is bent over upwards approximately parallel to the longitudinal edge (10) of the connection region (8). The two longitudinal edges (10 and 11) overlap one another in a plane which is perpendicular with respect to the movement plane of the lamella assembly, i.e., in a vertical plane. Moreover, the connection regions (8 and 9) also overlap one another in the movement plane of the lamella assembly, with the result that the longitudinal edges (10 and 11) form corresponding undercuts. The longitudinal edges (10 and 11) are spaced apart from one another. This produces, between the connection regions (8 and 9), an interspace which ensures sufficient freedom of movement for the lamella roof parts (4, 5) during opening and closing of the lamella roof.

The lamella roof parts (4, 5) move via displaceable swivel bearings (16), only a swivel bearing (16) being schematically represented in FIG. 2. Each swivel bearing (16) forms the front bearing point of each lamella roof part (4, 5), about which the respective lamella roof part pivots out upwards during separation of the lamella assembly, i.e., during the opening movement of the lamella roof (3). Said movements are not hindered by the connection regions (8, 9) between adjacent lamella roof parts (4, 5).

In each case one elastic seal (13, 14, 15) is provided between the connection regions (8, 9) of adjacent lamella roof parts (4, 5), which seal, when the lamella assembly is in the closed state, seals the interspace between the corresponding connection regions (8, 9) over the entire width of the roof cutout. This achieves sufficient leak-tightness for the lamella assembly in sheet-like form. The elastic seal (13, 14, 15) exhibits a sealing profile (13) which is provided with a hollow profile part (15), consists of an elastic material and is fastened on the longitudinal edge (10) of the upper connection region (8). For this purpose, the lamella roof part (4) exhibits an additional retaining web (12) at the level of each connection region (8). The hollow-profile part (15) is integral with the sealing profile (13) and, for reasons of clarity, is represented in the non-deformed state. However, the hollow-profile part (15) is only in said non-deformed state when the lamella assembly has been separated and the corresponding lamella roof parts (4, 5) are opened out obliquely upwards in the rear region of the roof cutout. In the depicted position according to FIG. 2, the hollow-profile part (15) would have to press to a considerable extent against the upper side of the connection region (9) and from beneath against the longitudinal edge (11). However, it is evident to a person skilled in the art how the hollow-profile part (15) deforms in this pressed position, as schematically depicted in dash lines 15' in FIG. 2. Provided a mating piece for the sealing profile (13), on the end side of the longitudinal edge (11), is a sealing border (14), which is pushed onto the end side of the longitudinal edge (11) over the entire width of the roof cutout, i.e., over the entire length of the lamella roof part (5). This forms, for the longitudinal edge (11), a blunt and edge which prevents damage to the elastic sealing profile (13).

As soon as the sheet-like lamella assembly is subjected to force due to a break-in attempt or an accident, the longitudinal edges (10, 11) latch one inside the other as the lamella roof parts (4, 5) begin to deform, and thus prevent quick separation of the sheet-like lamella assembly. Since the entire sheet-like lamella assembly is, in addition, guided laterally on the roof cutout, it is virtually impossible for the lamella assembly to break out of the same.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Lamella roof for a motor vehicle, which is arranged in a roof cutout of a vehicle bodywork and exhibits a plurality of lamella roof parts which are arranged parallel to and one behind the other in the vehicle longitudinal direction and, when the roof cutout is closed, have adjoining surfaces flush with one another in a sheet-like lamella assembly and, in order to the roof cutout, can be moved rearwards, the lamella assembly being gradually separated in the process such that the lamella roof parts are at least pivoted to an open position, wherein each lamella roof part includes securing catches which extend essentially over the width of the roof cutout and have longitudinal edges which are bent obliquely to the respective adjoining surface and which overlap corresponding longitudinal edges of the respectively adjacent lamella roof part, and wherein, in a normal operation of the lamella roof, the longitudinal edges of corresponding securing catches of the lamella roof parts are spaced apart from one another such that the longitudinal edges do not interfere with one another during pivoting movements of the lamella roof parts which occur during opening and closing.

2. Lamella roof according to claim 1, wherein the securing catches are provided in the region of associated connection regions of adjacent lamella roof parts, the securing catches overlapping one another approximately parallel to the plane of the lamella assembly.

3. Lamella roof according to claim 2, wherein interspaces remaining between corresponding securing catches of adjacent lamella roof parts are sealed by elastic seals, which are each connected to at least one of the two corresponding securing catches.

* * * * *